United States Patent
Kapoor et al.

(10) Patent No.: US 10,185,910 B2
(45) Date of Patent: Jan. 22, 2019

(54) CONTROL SYSTEM FOR CONTROLLING THE POWER CONSUMPTION OF A WIRELESSLY POWERED ELECTRONIC DEVICE

(75) Inventors: Ajay Kapoor, Veldhoven (NL); Gerard Villar Pique, Eindhoven (NL); Jose de Jesus Pineda De Gyvez, Eindhoven (NL)

(73) Assignee: NXP B.V., Eindhoven (NL)

( * ) Notice: Subject to any disclaimer, the term of this patent is extended or adjusted under 35 U.S.C. 154(b) by 256 days.

(21) Appl. No.: 13/475,854

(22) Filed: May 18, 2012

(65) Prior Publication Data

US 2012/0303983 A1 Nov. 29, 2012

(30) Foreign Application Priority Data

May 27, 2011 (EP) .................................... 11167938

(51) Int. Cl.
G06K 19/07 (2006.01)
G06F 1/32 (2006.01)

(52) U.S. Cl.
CPC ....... *G06K 19/0723* (2013.01); *G06F 1/3206* (2013.01)

(58) Field of Classification Search
USPC ........................................................ 713/322
See application file for complete search history.

(56) References Cited

U.S. PATENT DOCUMENTS

| 7,519,843 B1 | 4/2009 | Buterbaugh et al. |
| 7,805,263 B2 | 9/2010 | Mack |
| 2002/0097144 A1 | 7/2002 | Collins et al. |
| 2003/0121985 A1 | 7/2003 | Baldischweiler et al. |

(Continued)

FOREIGN PATENT DOCUMENTS

| CN | 101044776 A | 9/2007 |
| DE | 10 2005 048 016 A1 | 4/2007 |

(Continued)

OTHER PUBLICATIONS

Hsu, J. et al. "A Wireless Power Pickup Based on Directional Tuning Control of Magnetic Amplifier", IEEE Transactions on Industrial Electronics, vol. 56, No. 7, pp. 2771-2781 (Jul. 2009).

(Continued)

*Primary Examiner* — Kim Huynh
*Assistant Examiner* — Joshua Neveln

(57) ABSTRACT

A control system (100) for controlling a power consumption of an electronic device (300) is provided. The electronic device is adapted to communicate with a reader device via a wireless communication interface. The control system comprises a measuring unit (102) being adapted for measuring an actual field strength of an electromagnetic field provided by the reader device to the control system, a power delivery unit (101) being adapted for delivering power received via the electromagnetic field to the electronic device, and a control unit (103) being coupled to the measuring unit and being adapted for providing a control signal to the electronic device for controlling the consumption of the power being delivered to the electronic device, wherein the control signal is based on the actual field strength of the electromagnetic field.

8 Claims, 5 Drawing Sheets

(56) References Cited

U.S. PATENT DOCUMENTS

| | | | |
|---|---|---|---|
| 2004/0155753 A1* | 8/2004 | Fischer | 340/10.1 |
| 2005/0133605 A1 | 6/2005 | Koyama et al. | |
| 2007/0108297 A1 | 5/2007 | Bates | |
| 2007/0229262 A1 | 10/2007 | Rofougaran | |
| 2008/0055091 A1 | 3/2008 | Song et al. | |
| 2008/0108397 A1 | 5/2008 | Piipponen et al. | |
| 2008/0122410 A1* | 5/2008 | Haid | G06F 1/305 323/223 |
| 2009/0219137 A1 | 9/2009 | Forster | |
| 2010/0253315 A1 | 10/2010 | Nehrig et al. | |

FOREIGN PATENT DOCUMENTS

| | | |
|---|---|---|
| EP | 2 023 464 A2 | 7/2008 |
| EP | 2023464 A2 | 2/2009 |
| JP | 2005078181 A | 3/2005 |

OTHER PUBLICATIONS

Kiani, M. et al. "An RFID-Based Closed Loop Wireless Power Transmission System for Biomedical Applications", IEEE Trans. on Cir. Syst. II: Express Briefs, vol. 57, No. 4, pp. 260-264 (Apr. 2010).

Paing, T. et al. "Wirelessly-Powered Wireless Sensor Platform", Proceedngs of the 37$^{th}$ European Microwave Conference, pp. 999-1002 (Oct. 2007).

Poon, A. et al. "Optimal Frequency for Wireless Power Transmission Into Dispersive Tissue", IEEE Transaction on Antennas and Propagation, vol. 58, No. 5, pp. 1739-1750 (May 2010).

Si, P. "A Frequency Control Method for Regulating Wireless Power to Implantable Devices", IEEE Transactions on Biomedical Circuits and Systems, vol. 2, No. 1, pp. 22-29 (Mar. 2008).

Wang, G. et al. "High Efficiency Wireless Power Transmission with Digitally Configurable Stimulation Voltage for Retinal Prosthesis", Proceedings of the 2$^{nd}$ International IEEE EMBS Conference on Neural Engineering, pp. 543-546 (Mar. 2005).

Xin, W. et al. "Wireless Power Transmission System for Capsule Endscope", The Ninth International Conference on Electronic Measurement & Instruments, ICEMI, pp. I-820-I-824 (2009).

Johnson, R. C. "Wireless Energy Transfer Turns on Bulb in MIT Demo",2 pgs., retrieved from the Internet May 16, 2012 at: http://www.eetimes.com/electronics-news/4071925/Wireless-energy-transfer-turns-on-bulb-in-MIT-demo(Jun. 11, 2007).

Johnson, R. C. "Updated: Intel CTO Surveys Tech Future", 3 pgs., retrieved from the Internet May 16, 2012 at: http://www.eetimes.com/electronics-news/4078771/Updated-Intel-CTO-surveys-tech-future (Aug. 21, 2008).

"Wireless Electricity Delivered Over Distance", 1 pg., retrieved from the Internet May 18, 2012 at: http://www.witricity.com.

"Wireless Power Solutions | Powercast Corp.", 3 pgs., retrieved from the Internet May 18, 2012 at: http://www.powercastco.com.

"Wireless Power Consortium—Creating the Standard for Wireless Charging", 3 pgs., retrieved from the Internet May 18, 2012 at: http://www.wirelesspowerconsortium.com.

Extended European Search Report for EP Patent Appln. No. 11167938.7 (dated Oct. 21, 2011).

Office Action from counterpart application CN 201210162718.1 (dated Jun. 27, 2014).

Office action for EP counterpart Patent Appl. No. 11167938.7 (dated Jul. 10, 2013).

Extended European Search Report for EP counterpart Patent Appl. No. 11167938.7 (dated Oct. 31, 2011).

* cited by examiner

CONTROL SYSTEM FOR CONTROLLING THE POWER CONSUMPTION OF A WIRELESSLY POWERED ELECTRONIC DEVICE

FIELD

The invention relates to a control system for controlling a power consumption of an electronic device.

Beyond this, the invention relates to an electronic device.

Moreover, the invention relates to a communication system.

Furthermore, the invention relates to a method of controlling a power consumption of an electronic device.

Moreover, the invention relates to a computer-readable medium.

Beyond this, the invention relates to a program element.

BACKGROUND

A traditional way of supplying the energy to electronic devices requires physically connecting the device to an energy source. The energy source may be a non-mobile source like line power or a mobile source like a battery. During the normal operation of these devices, the energy source is considered as a static energy source, that means there is an insignificant change in the characteristics of the energy source. Nowadays, a growing number of applications are used where energy is supplied wirelessly to an electronic device. A commonly used contactless smart card, a wireless sensor or a body area network are some of the applications where wireless energy transfer principles are commonly employed. It can be envisioned that, in the near future, more and more applications will be powered by some form of energy packets that will be delivered to them wirelessly.

Wireless energy transfer may be performed by magnetic coupling to wirelessly transfer energy. A general device using magnetic coupling to transfer wireless energy comprises transmitter coils to set up the magnetic field, which induces current in the receiver coils to charge the battery. The power transmission part comprises a power source and a transmitting coil to set up an electromagnetic field. The receiver is divided into a receiving coil, a rectifying circuit, and an electronic system storing and using the received energy. The energy received from a wireless means is stored in an energy storage device. This energy may be used for providing energy to various system elements, which may include analog, digital electronic components, sensors, transducers, etc.

In normal applications, the receiver system consists of digital and analog subsystems. The analog subsystem is mainly used to transfer and receive the information signal, while the digital part mainly processes the information. The computation strategy relies on computing as long as energy is available and stopping if energy is not available.

Due to the wireless nature of energy transfer, the energy source can have varied characteristics as seen by a receiver. Similar characteristics may be observed for wireless data communication. Therefore, the rate of energy transfer varies according the operating environment and the system should be aware of this variation.

Common electronic systems are designed for a steady power supply. For systems supplied with the wireless power, the available energy varies continuously during the operation. This variability may get worse due to the mobile nature of applications. The usual practice of operating the system in a similar power-consuming mode does not take into account the aforementioned variability. Consequently, the maximum performance that can be expected from such a system is limited. For example, a device required to work in weak energy fields will be designed for low power consumption and hence, low throughput. This may be achieved by choosing a low clock frequency of the digital system and adjustment of the corresponding design parameters in other subparts of the system. Consequently, even if the energy fields get stronger, the maximum throughput of such a system saturates at a maximum clock rate and does not improve further.

On the other hand, the computing platform can also be designed to perform very fast computations with a high power consumption by using a high clock rate and other design parameters. However, the weak energy environment will lead to very frequent starting and stopping of such a system. Depending on the application requirements, this may not be desirable as it can lead to unreliable computing times and may cause uncontrollable EMI to other devices in the proximity. In extreme cases, the weak energy field may not be able to support the switching currents required for the high clock rate and the device may not be able to operate. To summarize this, common systems may have the following limitations:

A weak-field based device cannot take advantage of strong fields, wastes energy, and has limited throughput. A strong-field based device limits the maximum distance between wireless-powered transmitter and receiver. Other side effects like unwanted starting-stopping times, EMI issues for neighboring devices, unpredictable computing time, etc. can also arise due to frequent starting and stopping of a system.

US2003121985 discloses a transponder located, for example, in a contactless smart card. The transponder receives energy via an antenna from a high-frequency alternating field. A voltage formed with a rectifier is fed as a control quantity to a clock generator with a clock frequency adjusting device. At high field strength on the antenna, the voltage is adjusted downwards by increasing the clock frequency for a digital circuit. If no further increase of clock frequency of the clock signal is possible, a charge pump is connected for an EPROM in order to increase the writing speed thereof. Optionally, a conventional shunt regulator can be connected as well. An interface circuit is not affected by the adjusted clock frequency, but works at a fixed frequency during communication with a reader.

US2002097144 discloses a portable data device having a power controller, a clock generator, and a digital circuit. The power controller has an output signal. The output signal is representative of available power. The clock generator is coupled to the output signal of the power controller for generating a variable clock rate corresponding to the output signal. The digital circuit is coupled to the clock generator, and the digital circuit is controlled by the variable clock rate.

OBJECT AND SUMMARY

It is an object to provide a control system or method for providing an efficient way of controlling the power consumption within an electronic device.

In order to achieve the object defined above, a control system, an electronic device, a communication system, a control method, a computer-readable medium, and a program element according to the independent claims are provided.

According to an exemplary embodiment, a control system for controlling a power consumption of an electronic device is provided. The electronic device is adapted to communicate with a reader device via a wireless communication interface. The control system comprises a measuring unit being adapted for measuring an actual field strength of an electromagnetic field provided by the reader device to the control system, a power delivery unit being adapted for delivering power received via the electromagnetic field to the electronic device, and a control unit being coupled to the measuring unit and being adapted for providing a control signal to the electronic device for controlling the consumption of the power being delivered to the electronic device, wherein the control signal is based on the actual field strength of the electromagnetic field.

According to a further exemplary embodiment, an electronic device for communicating with a reader device via a wireless communication interface is provided. The electronic device comprises a control system having the above mentioned features.

According to a further exemplary embodiment, a communication system is provided. The communication system comprises a reader device and an electronic device having the above mentioned features, wherein the reader device and the electronic device are adapted to communicate via a wireless communication interface.

According to a further exemplary embodiment, a method of controlling a power consumption of an electronic device, wherein the electronic device is adapted to communicate with a reader device via a wireless communication interface, is provided. The method comprises measuring, by a measuring unit, an actual field strength of an electromagnetic field provided by the reader device to the control system, delivering, by a power delivery unit, power received via the electromagnetic field to the electronic device, and providing, by a control unit being coupled to the measuring unit, a control signal to the electronic device for controlling the consumption of the power being delivered to the electronic device, wherein the control signal is based on the actual field strength of the electromagnetic field.

According to a further exemplary embodiment, a computer-readable medium is provided, in which a computer program of controlling a power consumption of an electronic device is stored, which computer program, when being executed by a processor, is adapted to carry out or control a method having the above mentioned features.

According to still another exemplary embodiment, a program element (for instance, a software routine, in source code or in executable code) of controlling a power consumption of an electronic device is provided, which program element, when being executed by a processor, is adapted to carry out or control a method having the above mentioned features.

Controlling a power consumption of an electronic device, which may be performed according to various exemplary embodiments, can be realized by a computer program that is by software, or by using one or more special electronic optimization circuits, that is in hardware, or in hybrid form, that is by means of software components and hardware components.

The term "power consumption" may denote the power or energy which is used by the electronic device.

The term "electronic device" may denote, for example, a smart-card, transponder, or RFID tag. The electronic device may be used, for example, for communicating with a reader device as a near field communication device.

The term "power," which can be delivered to the electronic device, may denote, for example, electrical energy being used by the electronic device for performing operations, like computational operations.

The term "measuring unit" may denote any kind of unit or element being able to measure an actual field strength of an electromagnetic field, for example, by using the receiving coils of the electronic device.

The term "power delivery unit" may denote any kind of element being adapted for delivering received power to one or more parts of the electronic device.

The term "control unit" may denote any unit being adapted for controlling the power consumption of the electronic device, for example, by sending a signal to the electronic device comprising information about the actual available energy or power.

In the following, further exemplary embodiments of the control system will be explained. However, these embodiments also apply to the electronic device, the communication system, the control method, to the program element, and to the computer-readable medium.

The power delivery unit may comprise a power converter being adapted for converting power. The power received via, for instance, by the receiving coils of the electronic device may be converted by the power converter dependent on the power used by the parts of the electronic device to be supplied with the power.

The power delivery unit may be adapted for delivering power to a plurality of sections of the electronic device and the power converter may be adapted for converting power dependent on the section of the electronic device, to which the power is delivered. The power delivery unit may comprise for example units being adapted for performing an active or passive voltage division.

In common system, several parts of the electronic device, for instance modem and digital part, are supplied with the same supply voltage, which leads to a restriction of the voltage reduction of the digital part of the system. By using a power delivery system, as mentioned above, like LDO or switch capacitor based power converter, which may be used to supply different power supplies in a regulated manner to different parts of the system, a decoupling may be achieved allowing to operate for example the digital system at or near sub-threshold voltages. Therefore, the most power hungry blocks (computing system) may be supplied with more power than other parts. This means that digital computing (which can be a contributor of major energy consumption) can operate in a more efficient way. Simultaneously, low voltages also mean lower leakages.

In common systems, the voltage build up of an energy capturing circuit is often directly fed to the computing circuit. Such a system is designed for the minimum operating field/voltage. If the field gets stronger, the clock is adjusted accordingly. However, there will always be latency in the clock adjustments. This means that the computing system and modem will see voltage variations and should be overdesigned to compensate.

In contrast to this, according to embodiments of the invention, by using the isolation or decoupling as mentioned above may allow to have a relatively fixed voltage to the computing system. Therefore, the overall system design may get simpler. This is especially important as power consumption optimization requires all components to work at the lowest possible power supplies.

The measuring unit may comprise a comparator being adapted for comparing the actual field strength with a reference value.

The reference value may be associated with an amount of available power being sufficient to start operating specific parts of the electronic device. On another embodiment, the actual measured field strength may be compared with a plurality of reference values, wherein each reference value may be associated with a specific part of the electronic device.

The measuring unit may comprise a sensing circuitry for sensing the voltage on a storage capacitor of the electronic device, wherein the value of the sensed voltage is associated with the value of the actual field strength, and wherein the reference value is a reference voltage value.

The electronic device may comprise a storage capacitor for storing received power. This power corresponds to the power being available for the electronic device. The measuring unit may be adapted for measuring or determining the actual field strength based on the power stored in the capacitor. The measuring unit may further be adapted for comparing the stored power, i.e., voltage, with a reference voltage.

The control signal may be indicative for at least one of the group consisting of a voltage modulation and a frequency modulation. Also a combination of both may be used.

By using a voltage modulation and/or frequency modulation, the electronic device may adapt the actual power consumption. By using a frequency modulation for instance, the clock used for operations may be increased or decreased dependent on the available power.

The control unit may be adapted for providing the control signal to a plurality of sections of the electronic device.

For instance, different modes of energy or power modulation may be achieved. For example, voltage and/or frequency adjustments may be allowed for the digital sections. Also, other parts of the system may also be adjusted to have different energy profiles by allowing voltage scalability through the power converter block.

Common systems are designed to operate at the highest frequency and hence, synthesized accordingly. In the near-sub-threshold designs, this can have major impact on the designed area and power consumption (high capacitance switching). To overcome this, one can design the system at nominal field strengths. If the field gets weaker, one may reduce the clock frequency. If the field gets stronger, one may increase the supply voltage and clock frequency simultaneously. This approach will result in lower area and lower capacitance. Eventually, this leads to increase in operating distance and lower costs (area). These observations are the major differentiating factor in such applications (very high volume). Such approaches are possible according to embodiments of the invention, but not in common systems as they only use frequency adaptation without voltage modulation.

The control unit may be adapted for providing a different control signal to each of the plurality of sections of the electronic device.

Further, in digital systems, energy is mainly consumed in spikes around the clock edges. Therefore, energy is consumed in short time durations while power is mentioned in terms of energy over clock duration. The effect of this kind of energy consumption might result in voltage fluctuations on the voltage supply. This means that, the modem part which consists of analog modules will be overdesigned due to the non constant supply voltage. This overdesigning can be avoided using the system having one of the above mentioned features. By providing different control signals to different sections of the electronic device, the various requirements of the various parts or sections of the electronic device might be taken into account.

The control system according to the different embodiments combines the use of a power converter along with some adjustments, for example a clock frequency adjustment. Moreover, the input voltage of the power converter may be held fixed at an ideal sweetspot through, for instance, clock frequency scaling for maximum power efficiency conversion.

In the following, further exemplary embodiments of the electronic will be explained. However, these embodiments also apply to the control system, the communication system, the control method, to the program element and to the computer-readable medium.

The electronic device may further comprise a plurality of sections, wherein the control system is adapted for providing a control signal to each of the plurality of sections of the electronic device, and wherein each section is adapted for modulating its operation based on the control signal.

The modulation may consist of a clock frequency modulation or a voltage modulation or a combination of both.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
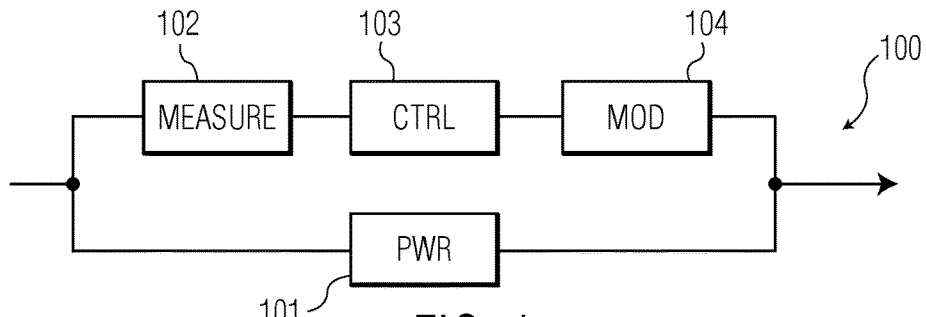
FIG. 1 illustrates a control system according to an exemplary embodiment of the invention.

The illustration in the drawing is schematically. In different drawings, similar or identical elements are provided with the same reference signs.

Figure 7:
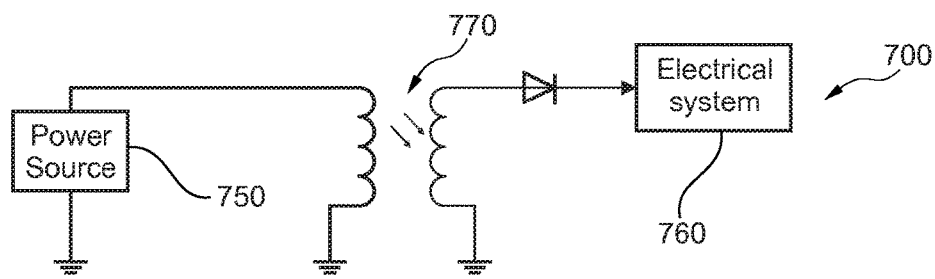
FIG. 7 illustrates a common device using magnetic coupling for energy transfer.

FIG. 7 illustrates a common device 700 using magnetic coupling to transfer wireless energy. The basic principle is that the transmitter coils set up the magnetic field, which induces current in the receiver coils to charge the battery (770). The power transmission part comprises a power source 750 and a transmitting coil to set up an electromagnetic field. The receiver is divided into a receiving coil, a rectifying circuit and an electronic system 760 storing and using the received energy. The energy received from a wireless means is stored in an energy storage device (for example a capacitor). This energy is used for providing energy to various system elements, which may include analog, digital electronic components, sensors, transducers etc.

Figure 8:
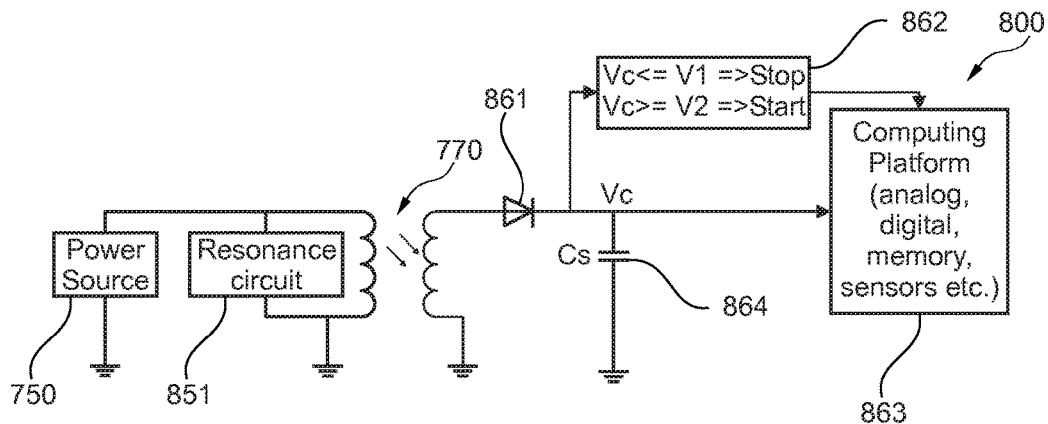
FIG. 8 illustrates another common device using magnetic coupling for energy transfer.

FIG. 8 illustrates another common device 800. In normal applications, the receiver system consists of digital and analog subsystems 863. The transmitter system comprises a resonance circuit 851 for generating energy.

The analog subsystem is mainly used to transfer and receive the information signal while the digital part mainly processes the information. The computation strategy relies on computing as long as energy is available and stopping if energy is not available (see block 862). Usually, some form of energy sensor is used to detect the availability of energy. For example, measurement of the voltage level of the energy storage device 864, for example a capacitor, can be used for energy sensing.

Due to the wireless nature of energy transfer, the energy source can have varied characteristics as seen by a receiver. The problem is somewhat similar to what is observed in the wireless data communication. Therefore, the rate of energy transfer varies according the operating environment and the system should be aware of this variation.

The electronic systems are designed considering a steady power supply. For systems supplied with the wireless power, the available energy varies continuously during the operation. This variability may get worse considering the mobile nature of applications. The usual practice of operating the system in a similar power-consuming mode (as described earlier) does not take into account the aforementioned variability. Consequently, the maximum performance that can be expected from such a system is limited. For example, a device required to work in weak energy fields will be designed for low power consumption (and hence, low throughput). This may be achieved by choosing a low clock frequency of the digital system and adjustment of the corresponding design parameters in other subparts of the system. Consequently, even if the energy fields get stronger, the maximum throughput of such a system saturates at maximum clock rate and does not improve further. On the other hand, the computing platform can also be designed to perform very fast computations (consequently, high power consumption) by using a high clock rate and other design parameters. However, the weak energy environment will lead to very frequent starting and stopping of such a system. Depending on the application requirements, this may not be desirable as it can lead to unreliable computing times and may cause uncontrollable EMI to other devices in the proximity. In extreme cases, the weak energy field may not be able to support the switching currents required for the high clock rate and the device may not be able to operate. To summarize this, common or general systems have the following limitations:

A weak-field based device cannot take advantage of strong fields, wastes energy, and has limited throughput. A strong-field based device limits the maximum distance between the wireless-powered transmitter and the receiver. Other side effects like unwanted starting-stopping times, EMI issues for neighboring devices, unpredictable computing time, etc. can also arise due to frequent starting and stopping of a system.

Another aspect is the design and efficiency of power conversion and delivery blocks. Normally, the power converter can be designed for high efficiency if the voltage range for input and output ports is limited. Usually, the output voltage is a fixed voltage and the input voltage varies according to the design. In wirelessly powered systems, if the threshold levels for starting and stopping are very close to each other, then higher power conversion can be achieved by centering the threshold band around the optimum power conversion point. But, it will lead to frequent charging and discharging and will limit the operation in weak energy fields. If threshold levels are widely apart, then the design of the power converter block will become complex and may result in lower efficiency.

Therefore, the control system and control method as described herein proposes adaptability in the operation of a device in response to the variation in wireless power reception. This means that the behavior of the system (throughput, power consumption, etc.) changes as the energy supplying environment around the system changes. This adaptation in the behavior of the system may ensure high performance from the system in strong energy fields and sustained operation in the weak energy fields (at lower throughput). The latter will result in a larger operating range, which can be a major differentiating factor for these applications. Simultaneously, the system and method may ensure a steady power consumption (and hence, throughput) which implies deterministic computing time in various energy fields. To achieve this, the proposed scheme senses the wireless field strength continuously in an analog manner. This energy field measurement is fed to a controller subsystem. The output of this controller is used to modulate the power consumption and hence, throughput, in the electronic system.

According to some embodiments, an analog electronic sensing circuit is used to sense the voltage on a storage capacitor and to compare it against a reference voltage. The sensor output is fed to a PID controller, which controls the power consumption of the system. Then dynamic frequency scaling is used to modulate the power consumption of the system. The described system and method may provide, inter alia, the following features:

Field resilience operation may outperform systems which are specifically designed for a narrow field profile. Higher performance (e.g. throughput) than a traditional system and longer operational distance may occur. Easier/Efficient power converter design and hence better energy efficiency may occur. Predictable computing time and hence more reliable operation may occur. Lower EMI problems and easier frequency footprint control in varying fields may occur.

Figure 9:
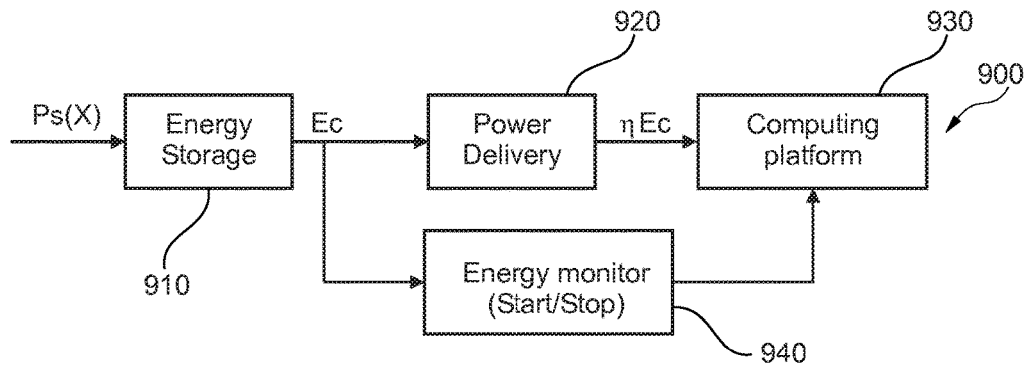
FIG. 9 illustrates a wireless power receiver system.

Wireless power receiver systems can be thought of three main stages. The first stage traps the electromagnetic power, converts and stores it in into electrical energy. The second stage uses this stored energy to provide power (voltage and current) to the third stage of the system. The third stage is normally composed of a computing platform consisting of analog and digital modules. FIG. 9 depicts the entire system 900. The system's source power $P_s(x)$ depends on the proximity of the transmitter, x, and the environmental conditions. The amount of energy that can be supplied to the computing system 930 depends on the energy stored in the energy storage block $E_c$ 910. Not all the energy can be delivered to the digital system. Only a fraction is delivered that depends on the power conversion efficiency η of the power delivery block 920. Simultaneously, there is a parallel mechanism 940 which keeps track of the available energy and stops the system if energy is not available for operation.

Figure 10:
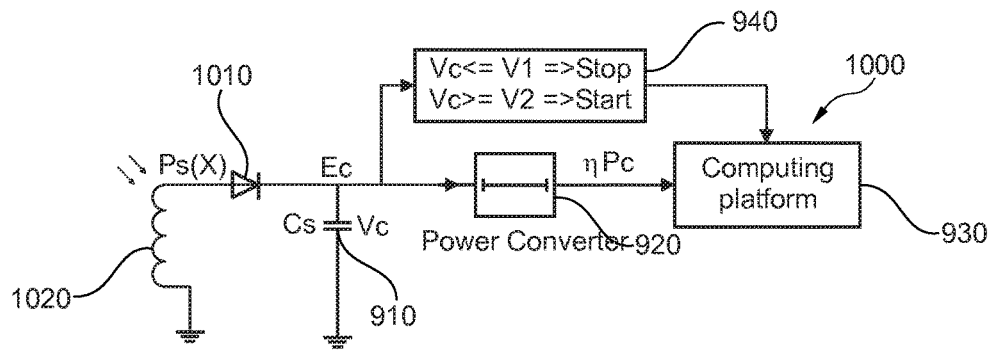
FIG. 10 illustrates a further example of a wireless power receiver system.

The control system and method as described herein may be applied in variety of systems. For ease of illustration, a top-level schematic of a general electronic device 1000 powered up wirelessly is shown in FIG. 10.

A storage capacitor $C_s$ 910 may be used to store the incoming energy (received via coil 1020). This energy is directly proportional to capacitance $C_s$ and quadratically proportional to the voltage level of $C_s$. Energy monitoring is depicted by a voltage comparator 940. However, other energy comparison principles may also be applied.

Figure 11:
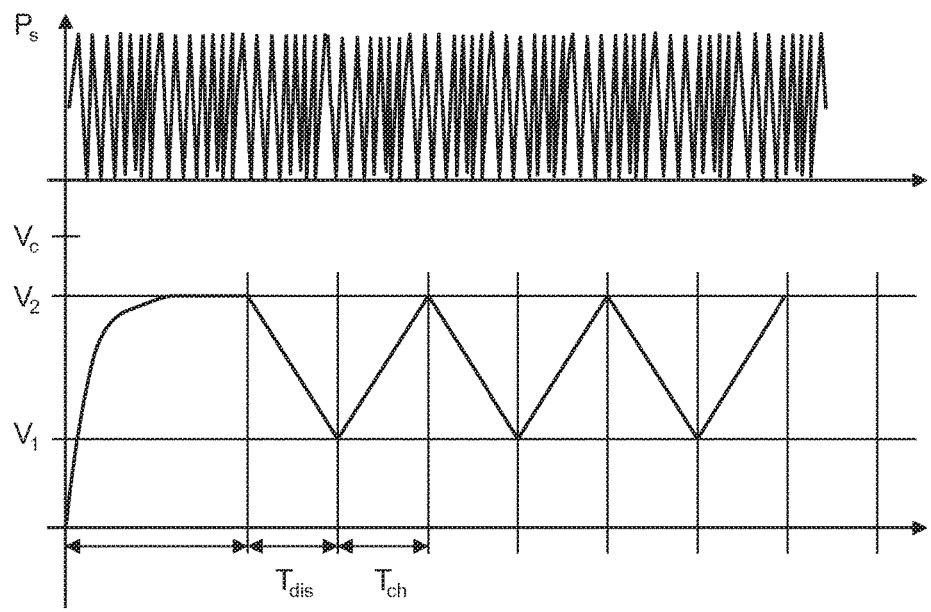
FIG. 11 illustrates the charge-discharge cycles of a storage capacitor.

In a common system, energy monitoring corresponds to a start/stop approach. For ease of explanation, energy monitoring is depicted by a voltage comparator block working on V1, V2 voltage levels. If the voltage is higher than level V2, the controller block lets the system run till the voltage drops to level V1. At this time, the controller stops the system and waits till the voltage rises again to level V2. In such a system, the duration of the 'start-period' can be visualized as the capacitor's discharge-time ($T_{dis}$) from V2→V1. Similarly, the duration of the 'stop-period' can be visualized as the capacitor's charge-time ($T_{ch}$) from V1→V2. The charge-discharge cycles of such a capacitor are shown in FIG. 11.

FIG. 1 illustrates a control system 100 according to an embodiment of the invention. The control system comprises a measuring unit 102 being adapted for measuring an actual field strength of an electromagnetic field provided by the reader device to the control system. A power delivery unit or power converter 101 is adapted for delivering power received via the electromagnetic field to the electronic device. A control unit 103 is coupled to the measuring unit and is adapted for providing a control signal to the electronic device for controlling the consumption of the power being delivered to the electronic device, wherein the control signal is based on the actual field strength of the electromagnetic field. The control system may be part of the electronic device. A modulation unit 104 may be provided for modulating the voltage signal.

Figure 2:
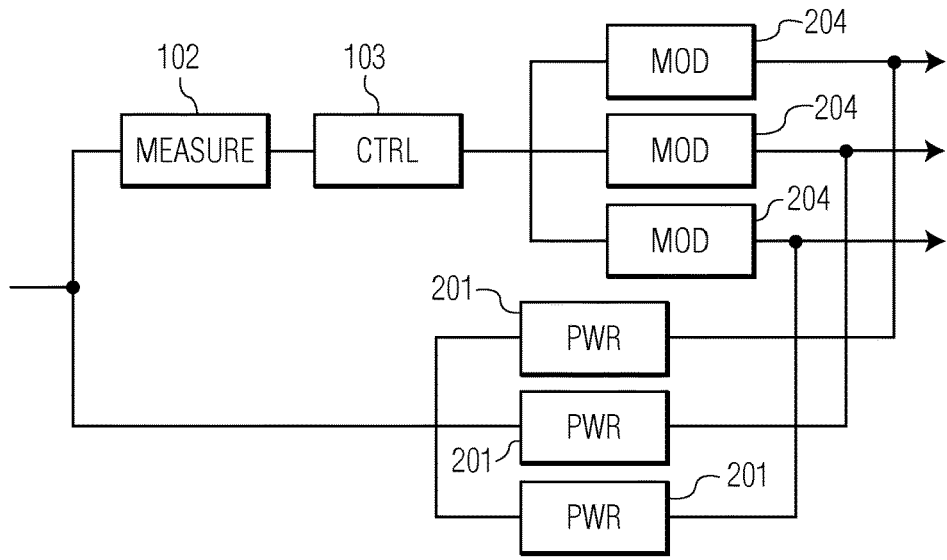
FIG. 2 illustrates a control system according to a further exemplary embodiment of the invention.

In a further exemplary embodiment as shown in FIG. 2, the control system 200 may comprise a plurality of power delivery units 201 for delivering power to a plurality of sections of the electronic device or may comprise one power delivery unit 201 for delivering power to a plurality of sections. The power converter of the power delivery unit 201 is adapted for converting power dependent on the section of the electronic device, to which the power is delivered.

The control unit 103 may be adapted for providing the control signal to a plurality of sections of the electronic device. This may be done, for example, via a plurality of modulation units 204.

Figure 3:
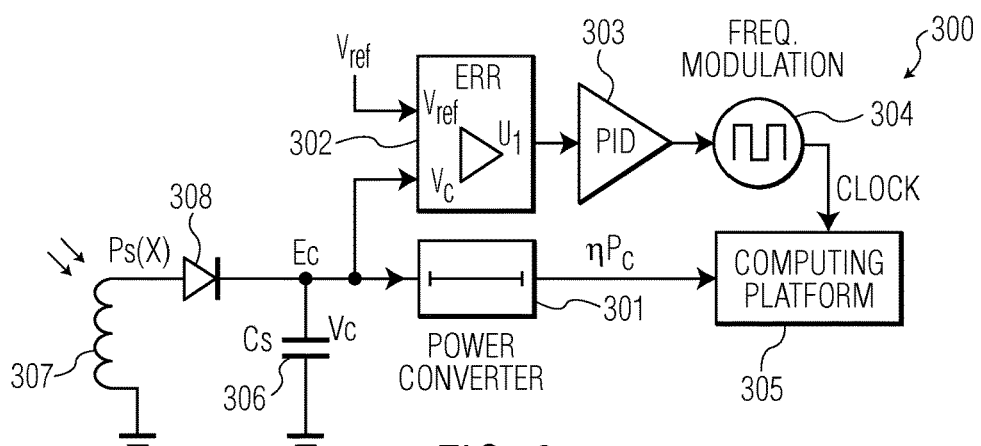
FIG. 3 illustrates an electronic device according to an exemplary embodiment.

FIG. 3 shows a further exemplary embodiment of the control system 300. The power consumption of the computing platform is controlled according to the incoming power, $P_s$. The power is received via coil 307. For this illustration, the frequency of the digital system is changed (304) to modulate the power consumption of the computing platform 305, but other means like voltage lowering etc. may also be applied. Moreover, a similar methodology can also be applied to other parts of system (e.g. analog blocks).

The voltage on storage capacitor $C_s$ 306 is compared (302) with a reference voltage ($V_{ref}$). If the voltage of capacitor 306 changes due to field strength variations, a generic controller translates the change into a change in the digital frequency of the system. Here, a controller 303 based on the PID principle is used for this illustration but other forms of controller schemes may also be applied. It is obvious that a stronger field results in higher digital frequency while a weaker field results in lower frequency. In this way, power consumption of the system can be adjusted according to the field of operation. It is worth noting that this topology will result in approximately constant $V_c \sim V_{ref}$.

Figure 4:
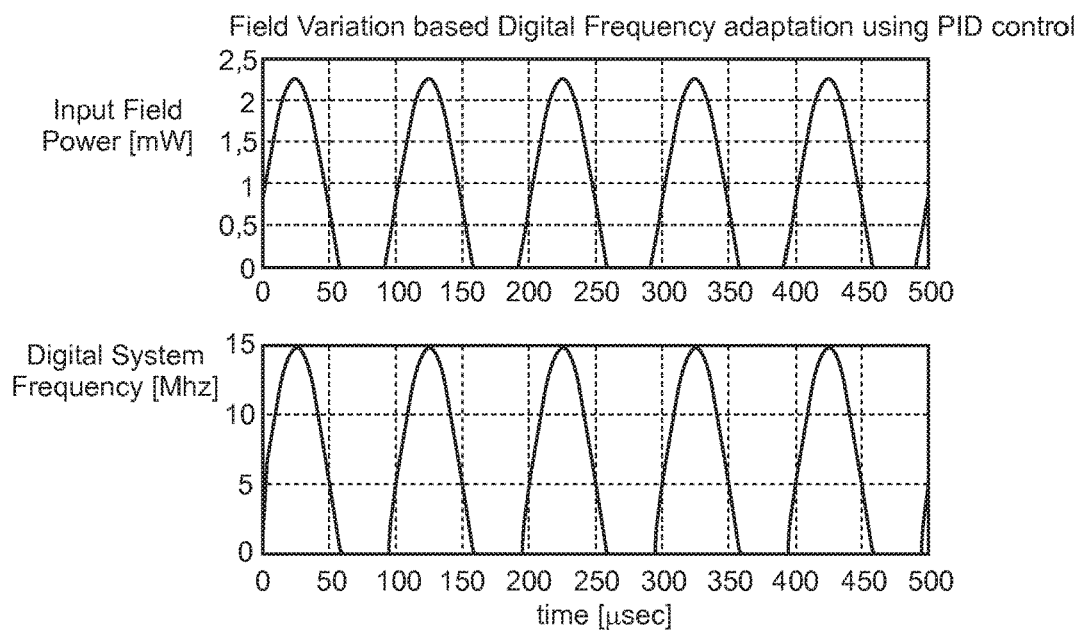
FIG. 4 illustrates a diagram showing the behavior of a system in a varying field.

Assuming steady state conditions and neglecting the power consumption in analog parts, the digital frequency of this system will be given by $$F_{clk} = \frac{\eta P_s}{\alpha C_D V_{DD}^2}$$

where, $\alpha C_D$ is the effective switching capacitance of the digital system. A simple illustration of the behavior of a system in a varying field is shown in FIG. 4. Here, the input power is varying in a sinusoidal manner and results in frequency modulation of the digital system.

Figure 5:
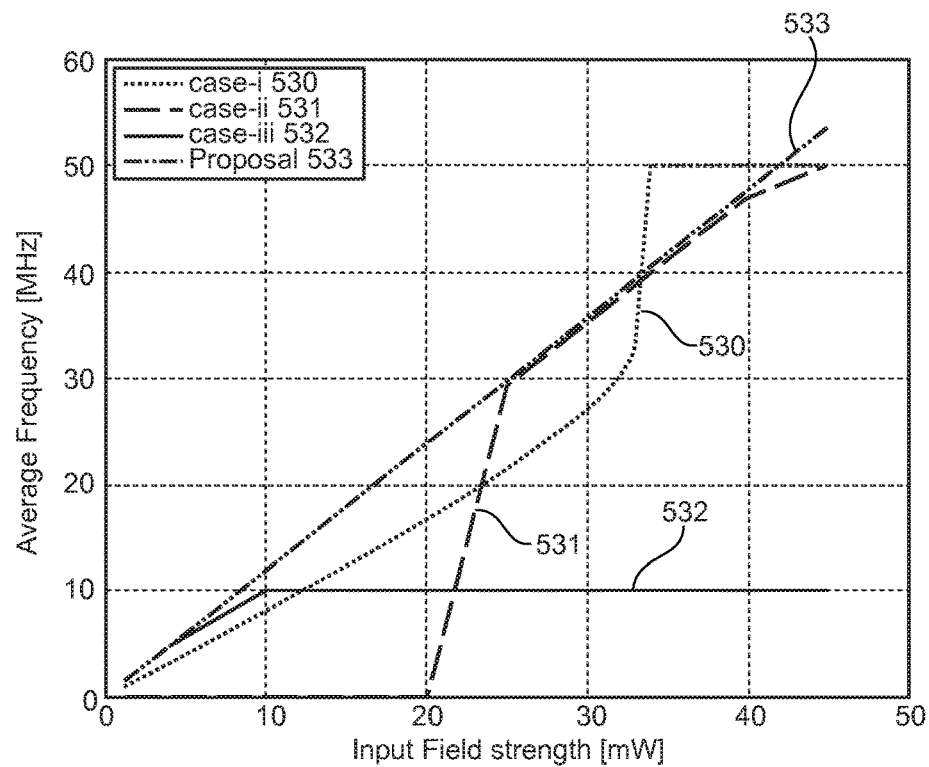
FIG. 5 illustrates a diagram showing a performance comparison for various test cases.

The performance comparison for various test cases is shown in FIG. 5. Case-i 530 illustrates a frequency clock of 50 MHz, a start voltage of 3.3 V and a stop voltage of 1.2 V. Case-ii 531 illustrates a frequency clock of 50 MHz, a start voltage of 1.55 V and a stop voltage of 1.5 V. Case-iii 532 illustrates a frequency clock of 10 MHz, a start voltage of 1.55 V and a stop voltage of 1.5 V. The system according to this invention 533 uses a field aware adaptive operation.

It can be seen that for the current systems, a wider-hysteresis band results in lower throughput in most cases due to lower efficiency of the power converter 301. However, it results in relatively longer $T_{ch}$ and $T_{dis}$ times. This helps the system being operational for a wider range of field strengths, but with lower energy efficiency.

A narrow hysteresis band can exploit a higher power-converter efficiency and thus, results in higher throughput when it is operational. However, it also results in lowering the duration of charging and discharging. This limits the performance of the system in weak energy fields. Overall, it can be concluded that a higher clock frequency in a start-stop system will result in better performance for stronger fields while a lower clock frequency will allow the operation in weaker fields.

Figure 12:
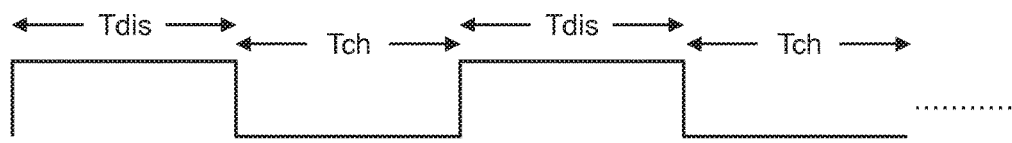
FIG. 12 illustrates a periodic signal of the frequency clock.

A narrow hysteresis band and/or high digital clock frequency results in frequent starting and stopping of the system. Another effect of frequent charging and discharging can be analyzed by considering the periodic signal depicted in FIG. 12. This signal is multiplied by the digital clock signal and will consequently cause a modification of the system's frequency spectrum. The effect is the convolution of this signal with the clock in the frequency domain.

As the hysteresis voltage band narrows, the $T_{ch}/T_{dis}$ also gets shorter and results in wider bandwidth of the overall system and may cause interference to neighboring environment. There is no such limitation with the proposed control system. Apart from a very short region, the proposed control system consistently outperforms the current designs in various fields. It can also be seen that the operating range is enhanced in weak fields. Therefore, the overall effect is that with this control system, new designs can work in longer range, higher throughput and with simpler power converter design.

The computation principles for a system as shown in FIG. 10 are summarized in the following. Let us investigate the approximate charge and discharge time of capacitor, $C_s$ (correspondingly, the wait and operation modes of the system). During the charge time ($T_{ch}$), the energy stored in the capacitor is $E_c$, where, $$E_c = \frac{C_s \Delta(V^2)}{2} = \frac{C_s(V_2^2 - V_1^2)}{2} \quad (1)$$

Here, $V_2$ is the upper bound voltage to which $C_s$ is charged, and $V_1$ is its initial lower bound voltage. This energy should be the same as the energy delivered from the power source ($P_s$) during time $T_{ch}$. It follows then that $$T_{ch} = \frac{E_c}{P_s} = \frac{C_s(V_2^2 - V_1^2)}{2P_s} \quad (2)$$

Once the capacitor voltage reaches the $V_2$ level, the digital system starts operating at a fixed clock frequency. Now, the system receives energy from the power source and burns the energy in the digital platform simultaneously. If the rate of energy consumption is more than the incoming power, the capacitor voltage decreases. After a certain discharge time ($T_{dis}$), this voltage reduces to the $V_1$ level. At this time, the digital system is stopped and the capacitor voltage starts building up again. From energy conservation laws $$(V_{DD}I_{DD} - \eta P_s)\Delta T_{dis} = -\eta C_s V_t \Delta V_t \quad (3)$$

where, $V_t$ is the instantaneous capacitor voltage discharge interval; $V_{DD}$ and $I_{DD}$ are the voltage and current in the digital system running at a fixed operating frequency; $\eta$ is the instantaneous efficiency of the power converter during duration $\Delta T_{dis}(=t, t+\Delta t)$. It can be seen from (3) that starting and stopping occurs in a system if $$V_{DD}I_{DD} \geq \eta P_s \quad (4)$$

Assuming, an LDO based power converter, $$\eta = \frac{V_{DD}}{V_t} \quad (5)$$

$T_{dis}$ can be computed by using (4) and integrating equation (3). This gives, $$T_{dis} = \frac{C_s}{I_{DD}}\left((V_2 - V_1) + \frac{P_s}{I_{DD}}\ln\left[\frac{V_2 - \frac{P_s}{I_{DD}}}{V_1 - \frac{P_s}{I_{DD}}}\right]\right) \quad (6)$$

In the preceding description, the performance of traditional system design was analyzed. One of the main limiting factors on the performance was the limited voltage range allowed at the input of the power converter. The consequence of this limitation is the shortening of allowable discharge time at the input capacitor. This effect is more dominant for the systems with narrow hysteresis band ($V_{start}$-$V_{stop}$) and becomes a serious bottleneck for field ranges for which system can operate. Overall, the narrow hysteresis band allows higher power-converter efficiency but a limited operating distance. One way of overcoming this limitation can be by allowing the voltage on the power converter to go beyond the hysteresis voltage for the last clock cycle. This may improve the field ranges and simultaneously provide the higher power converter efficiency than a normal wide hysteresis band system. However, this will require overdesigning the power converter for the input voltage ranges. Other problems due to frequent switching will not be solved. In the following, the throughput computation for this situation for the system parameters considered earlier will be performed, i.e., $V_{DD}$=1.2 V, $I_{DD}$=14 mA, $$T_{clk} = \frac{1}{50 \text{ MHz}},$$

power conversion efficiency ($\eta$~80%), $C_s$=2.5 nF.

Figure 6:
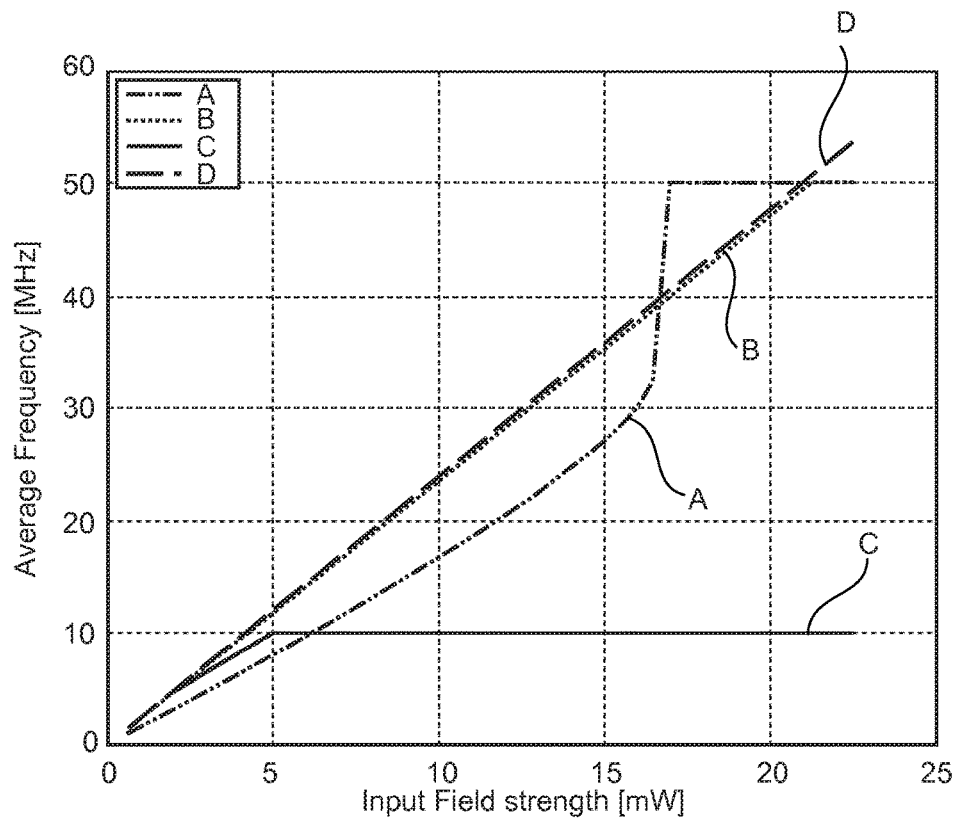
FIG. 6 illustrates a diagram showing a performance comparison of different systems.

In this case, the throughput of the various system configurations is shown in FIG. 6. A has $V_{dd}$ of 1.2 V, a clock frequency of 50 MHz, a start voltage of 3.3 V and a stop voltage of 1.2 V. B has $V_{dd}$ of 1.2 V, a clock frequency of 50 MHz, a start voltage of 1.55 V, and a stop voltage of 1.5 V. C has $V_{dd}$ of 1.2 V, a clock frequency of 10 MHz, a start voltage of 1.55 V, and a stop voltage of 1.5 V. D, corresponding to an embodiment of the control system according to this invention, has $V_{dd}$ of 1.2 V and a PID based frequency control.

From the throughput point of view, it seems that a narrowband system is a limiting case for this when the hysteresis band→0 (Proposed control system). Let us also consider the extended input voltage range required for such operation:

The worst case will assume that there is no energy trapped from the field during this clock period. Therefore, all the energy will be supplied by the storage capacitor.

$$E_c = \frac{C_s \Delta(V^2)}{2} = \frac{C_s(V_f^2 - V_i^2)}{2} \quad (7)$$

where, $C_s$=2.5 nF, $V_f$=1.5V, and $V_i$ is to be calculated.

$$E_{digital} = V_{DD}I_{DD}T_{clk} \quad (8)$$

where, $V_{DD}$ = 1.2 V, $I_{DD}$ = 14 mA, $T_{clk} = \frac{1}{50 \text{ MHz}}$

Taking into account power conversion efficiency ($\eta$~80%), $$E_{digital} = \eta E_c \quad (9)$$

Based on equations, (7-9)

$$V_i = \sqrt{V_f^2 - \frac{2V_{DD}I_{DD}T_{clk}}{\eta C_s}} \quad (10)$$

For the parameters considered in the computations, i.e.,
$V_f$=1.5 V; $V_{DD}$=1.2 V; $I_{DD}$=14 mA; $T_{clk}$=20 ns; $\eta$=0.8; $C_s$=2.5 nF
→$V_i$=1.3835 V This means that the system may be overdesigned for this extended range while other penalties as highlighted earlier will also be present. But, throughput of the system with the proposed system and traditional design can be matched with this approach.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A control system configured to control power consumption of an electronic device having a plurality of sections, wherein the electronic device communicates with a reader device via a wireless communication interface, the control system comprising:
- a measuring unit that is configured to measure an actual field strength of an electromagnetic field provided by the reader device to the control system based upon power stored in a capacitor;
- a plurality of power delivery units that are configured to receive power via the electromagnetic field, convert the received power with a power converter dependent on a respective section of the plurality of sections of the electronic device to which the received power is delivered, and deliver different respective power supplies from the power converter to each respective section of the plurality of sections of the electronic device via a plurality of modulation units; and
- a control unit, coupled to the measuring unit, that is configured to provide different respective control signals to each respective section of the plurality of sections of the electronic device for controlling the power consumption based on the voltage of the capacitor and simultaneously adjust both a supply voltage and a clock frequency.

2. The control system according to claim 1, wherein the measuring unit further comprises:
- a comparator that is configured to compare the actual field strength with a reference value.

3. The control system according to claim 2, wherein the measuring unit further comprises:
- sensing circuitry that is configured to sense a voltage on the storage capacitor, wherein a value of the sensed voltage is associated with a value of the actual field strength, and the reference value is a reference voltage value.

4. An electronic device for communicating with a reader device via a wireless communication interface, the electronic device comprising the control system according to claim 1.

5. The electronic device according to claim 4, wherein each respective section of the plurality of sections of the electronic device is configured to modulate its operation based on its own respective control signal.

6. A communication system, comprising the reader device and the electronic device according to claim 4, the reader device and the electronic device being configured to communicate via a wireless communication interface.

7. A method of controlling power consumption of an electronic device having a plurality of sections, wherein the electronic device communicates with a reader device via a wireless communication interface, the method comprising:
- measuring, by a measuring unit, an actual field strength of an electromagnetic field provided by the reader device to a control system based upon power stored in a capacitor;
- receiving, by a plurality of power delivery units, power via the electromagnetic field;
- converting the received power with a power converter in the plurality of power delivery units, wherein the converted power is dependent on a respective section of plurality of sections of the electronic device to which the received power is delivered;
- delivering, by the plurality of power delivery units, different respective power supplies to each respective section of the plurality of sections of the electronic device via a plurality of modulation units, and
- providing, by a control unit coupled to the measuring unit, via the plurality of modulation units, different respective control signals to each respective section of the plurality of sections of the electronic device for controlling the power consumption, based on the voltage of the capacitor and simultaneously adjust both a supply voltage and a clock frequency.

8. A non-transitory computer-readable medium, in which a computer program of controlling a power consumption of an electronic device is stored, which computer program, when being executed by a processor, to carry out or control the method according to claim 7.

* * * * *